United States Patent [19]
Weng

[11] Patent Number: 5,253,142
[45] Date of Patent: Oct. 12, 1993

[54] BODY STRUCTURE FOR A POCKET COMPUTER HAVING A FASTENER WITH MULTIPLE SPACED APART ELEMENTS

[75] Inventor: Phil Weng, Taipei, Taiwan

[73] Assignee: Cal-Comp Electronics, Inc., Taipei, Taiwan

[21] Appl. No.: 762,339

[22] Filed: Sep. 19, 1991

[51] Int. Cl.⁵ .................. H05K 5/02; G06F 1/16; E05C 19/06; H01H 13/70
[52] U.S. Cl. .................. 361/680; 361/683; 439/676; 292/87; 292/91; 400/490; 400/493.1; 400/494; 400/495; 200/341; 200/345; 16/223; 16/374; 16/386; 362/800; 362/244
[58] Field of Search ............ 439/676, 31, 165, 490; 292/87, 91, DIG. 38; 364/708; 400/490, 493.1, 494, 495; 200/54, 341, 345, 310-313, 316, 317; 248/917-919, 923, 922, 921; 16/223, 337, 341, 342, 374, 377, 386; 340/815.03, 815.15; 362/800, 244, 246; 361/380, 390-395, 399, 413, 415

[56] References Cited

U.S. PATENT DOCUMENTS

| | | | |
|---|---|---|---|
| 4,497,526 | 2/1985 | Myers | 439/676 X |
| 4,556,769 | 12/1985 | Inaba | 200/345 |
| 4,656,078 | 4/1987 | Goto et al. | 400/490 |
| 4,827,243 | 5/1989 | Cheng | 200/345 |
| 4,915,655 | 4/1990 | Tanaka | 439/676 |
| 4,918,271 | 4/1990 | Deeg | 200/345 |
| 5,001,659 | 3/1991 | Watabe | 364/708 |
| 5,035,641 | 7/1991 | Van-Santbrink et al. | 439/676 X |
| 5,062,671 | 11/1991 | Goetz et al. | 292/DIG. 38 X |
| 5,068,652 | 11/1991 | Kobayashi | 340/815.03 |

FOREIGN PATENT DOCUMENTS

| | | | |
|---|---|---|---|
| 2517901 | 11/1976 | Fed. Rep. of Germany | 16/386 |
| 685063 | 8/1986 | Japan | 361/380 |
| 2124156 | 2/1984 | United Kingdom | 400/490 |

OTHER PUBLICATIONS

IBM Technical Disclosure Bulletin, vol. 30, No. 1, Jun. 1987, pp. 408-411, "Keyboard With Advanced Row-To-Row Spacing". Copy in 400-490.

Primary Examiner—Leo P. Picard
Assistant Examiner—Michael W. Phillips
Attorney, Agent, or Firm—Jacobson, Price, Holman & Stern

[57] ABSTRACT

The body structure of a pocket computer includes a fastener mainly an elastic fastening element of a multi-layered construction accommodated in an insertion space located at a front edge of the main body housing. A simplified telephone input jack is constructed in the side wall of the pocket computer main body. The association of the main body and the cover body of the pocket computer is accomplished by a pivotal shaft, which is characterized in that it is provided with a delay swivel device permitting the communication cables linking the main body with the cover body to be less vulnerable to bending caused by the actions of opening and closing the cover body and that it includes indicator lights serving to show the operating status of electronic functions of the computer. The keyboard includes entry keys which are securely coupled with the housing plate of the keyboard by slide keys and slide key mounts. The entry key is made up of a face plate and a sole plate, which are of different colors, with the face plate including thereon a figured hole coinciding with a given alphanumerical symbol.

55 Claims, 13 Drawing Sheets

BODY STRUCTURE FOR A POCKET COMPUTER HAVING A FASTENER WITH MULTIPLE SPACED APART ELEMENTS

BACKGROUND OF THE INVENTION

The present invention relates to a computer, and more particularly to a pocket-size computer designed with an improved body structure.

Referring to FIG. 1 and FIG. 1-1, the pocket computer of the present invention similar in size to a video home system (V H S) is shown comprising a main body 10 and a cover body 20, which are pivotally connected. The cover body 20 is provided therein with an LCD (liquid crystal display) screen while the main body 10 is composed of a keyboard, a mouse connection port B and a magnetic card drive C located at the right side thereof, a printer connection port D and a disk drive connection port E located at the left side thereof, an image adjustment Knob F and a power supply switch G and a press button H for opening and closing the cover body located at the front side thereof, and an external power source input socket and a telephone jack I located at the back side thereof. It is essential that sizes of peripheral connection ports, control knobs, and various components of the computer must be miniaturized appropriately so as to be housed in the main body having a limited accommodating space available. It is therefore apparent that the structural integrity of various component parts of the computer is a compulsory prerequisite to achievement of the objective of reducing the over-all size of the computer to fit in the pocket of a user.

In general, the pivotal association of the main body with the cover body of a conventional portable computer of the prior art and the like is accomplished by a fastening means, which comprises mainly a fastening portion with a protruded means located at one side thereof and a recess located at the other side thereof. Such fastening means as mentioned above is defective in design in that it is vulnerable to damage brought about by abrasion taking place between the protruded means and the recess after a prolonged usage thereof. Other prior art methods of pivotally connecting the main body with the cover body of a portable computer involve in making use of an elastic element such as a spring to actuate an arresting device of the main body to become fastened with a retaining plate of the cover body, and by making use of an elastic element which serves to actuate a hooked piece of the main body to engage with a fastening means of the cover body in a manner similar to a hook-and-eye mechanism. These two methods described above are also faulty in design in that their relatively complicated structures and their relatively large sizes prevent the over-all size of the computer from being greatly reduced.

Now referring to FIG. 2, the telephone input jack of a prior art portable computer is shown comprising a seat body I1 of a square construction, which in turn is composed of a guide slot I 11 to receive therein a telephone plug I 2, and of a signal cable connection portion I 12 located at the upper portion thereof. The signal cable connection portion I 12 is provided with a plurality of signal cables I 13 entering thereinto from the rear end portion thereof and emerging therefrom at the front end portion wherein they form guide grooves I 14. In addition, the housing I 3 is composed of a receiving room I 31, which is formed by the side clamping wall I 32 to accommodate therein the square seat body I 1. In compliance with the specifications of the current telephone line plug I 2, the square seat body I 1 and the receiving room I 31 can not be further reduced in size. Accordingly, a substantial reduction in the size of the main body of the prior art portable computer is out of the question.

As shown in FIG. 3, a conventional pocket computer of the prior art is shown comprising a pivotal axis K coupling pivotally the main body 10 with the cover body 20 by means of pivotal ear buttons K 1 and K 2. However, the electronic communications between the main body 10 and the cover body 20, such as the electronic control of the image on the display screen of the cover body 20 by the central processing unit (C P U) located in the main body 20, depend on a bulk of communication cables K 3 which enter the bottom edge 21 of the cover body 20 from the upper edge 11 of the main body 10. As a result, communication cables K 3 are vulnerable to constant bending by the actions of opening and closing the cover body 20, thereby resulting in the fatigue of the cable cores which may eventually bring about the breakage of the communication cables K 3. In addition, the esthetic effect of the pocket computer is greatly compromised by the visible presence of cables K 3, as shown in FIG. 3.

Now referring to FIG. 4, the key L of the pocket computer Keyboard of the prior art is shown comprising an upper housing face plate L 1 with a circular hole L 11 located at the center thereof for permitting an elastic rubber diaphragm L 2 to float therein. The circular hole L 11 of the upper housing face plate L 1 is provided with two retaining hooks L 12, which are constructed on the wall of the circumference of the circular hole L 11 and are positioned oppositely. The press key L 3 is composed of two hook ears L 31 located oppositely on the undersides thereof and of a suppressing column L 32 located at the center of the underside thereof. In the process of assembling the component parts of the key mentioned above, the press key L3 is arranged on the upper housing face plate L 1 in such manners that the hook ears L 31 engage with the retaining hooks L 12 and that suppressing column L 32 presses against the top portion of the elastic rubber diaphragm L 2. It must be mentioned here that the engagement of hook ears L 31 with retaining hooks L 12 must not be too tight to prevent the press key L 3 from sliding upward and downward. For this reason, the thickness of hook ears L 31 and retaining hooks L 12 is generally reduced at the expense of positional stability of both press key L 3 and the upper housing face plate L 1. As a result, when the press key L 3 is pressed down, the suppressing column L 32 of the press key 1 3 may fail occasionally to press properly against the top portion of the elastic rubber diaphragm L 2, thereby resulting in a failure of entry of information. On the other hand, the press key L 3 may become detached easily when it is pressed down hard. It is therefore apparent that structural defects described above have to be overcome.

SUMMARY OF THE INVENTION

The present invention serves to overcome the above-mentioned shortcomings of the pocket computer of prior art.

It is therefore the primary objective of the present invention to provide a pocket-size computer with a fastening means of structural simplicity and ingenuity, which imparts an effective method of pivotally coupling the cover body and the main body of the computer and permits the over-all body size of the computer to be reduced substantially. The fastening means comprises mainly an elastic fastening element of multi-layered construction, which is accommodated in an insertion space located at the front edge of the main body housing. The multiple layers of the elastic fastening element are substantially spaced apart and are coupled with one another by means of a thin bracing piece. The press body located at the front end of the fastening means is provided with a hook retaining piece, which is capable of being actuated to hook up the hooked piece located correspondingly on the cover body when the press body is pushed inwardly. Such fastening means of simple and ingenious construction described above is therefore in conformity with the body design of compact form of a pocket-size computer.

It is another objective of the present invention to provide a pocket computer with a simplified telephone input jack constructed in the side wall of the computer main body. The telephone input jack o the present invention is different from the telephone input jack of the prior art in that it does not comprise a square seat body and a receiving room to accommodate the square seat body. As a result, the over-all size of the telephone input jack of the present invention is greatly reduced. In addition, the simplified telephone input jack of the present invention can be made and installed at a lower cost.

It is still another objective of the present invention to provide a pocket computer with a pivotal shaft, which is designed to couple the main body and the cover body of the pocket computer and is characterized in that it comprises a swivel section capable of turning in relation to both the main body and the cover body, and that it further comprises a delay swivel device located between the swivel section and the edge of the cover body adjacent to the pivotal shaft so as to enable the actions of opening and closing the cover body to delay the mechanism of actuating the swivel section, thereby resulting in a smaller total turning angle of the swivel section. As a result, the communication cables, which serve to communicate the main body with the cover body and pass through the swivel section, will not be vulnerable to bending caused by the actions of opening and closing the cover body.

The pivotal shaft further comprises a shaft-like covering piece having thereon a plurality of indicator lights serving to show the operating status of the electronic functions of the computer.

The pivotal ear buttons of the pivotal shaft are linked by means of a column-like pin, which is capable of being inserted with a considerable tightness into the link holes of the pivotal ear buttons and is provided with axial tangential grooves of a considerable depth so that the column-like pin is able to generate a elastic force when it is inserted into the link hole. By virtue of such elastic force, the cover body of the pocket computer of the present invention will not fall back after it is lifted to an open position to facilitate the user of the computer to read the display screen installed on the cover body.

It is still another objective of the present invention to provide a pocket computer with a keyboard comprising keys which are properly coupled with the housing plate so as to ensure that the displacement of the keys is effectively averted when the keys are pressed by the user. Each partitioned area of the housing plate is used to install therein each entry key and is provided with a circular tubular hole having a tubular flange of an appropriate height. The slide key the slide key and mount are arranged in positions located on an opposite angular line of the entry key corresponding to the tubular flange and between the tubular flange and the sole surface of the entry key. Located at another opposite angular line are hooks and hook retaining ears. The coordination of slide keys and slide key mounts imparts a stability of up-and-down movement of the entry key. Th restraining mechanism brought about by the hook and the hook retaining ear serves to anchor the entry key securely in place. Furthermore, the space that is occupied by each entry key is relatively reduced, because both hook and hook-retaining ears are arranged at the opposite angular space of the entry key.

The face plate and the sole surface of the entry key of the present invention are made respectively of materials having different colors and are made into a unitary body. Unlike the conventional entry key of the prior art, the alphanumerical marks of the entry key of the present invention will not be faded by constant touch of the user's fingers, because the marking of the entry key of the present invention is done on the sole surface and is shown through the face plate, thereby averting a direct contact between the user's finger and the alphanumerical marks of the entry key.

The foregoing features, objectives, and advantages of the present invention will be better understood by studying the following detailed description of the preferred embodiment of the present invention, in conjunction with the drawings provided herein.

BRIEF DESCRIPTION OF THE DRAWINGS

FIG. 1-1 is a three-dimensional view showing right side and rear side of the pocket computer as shown in FIG. 1.

FIG. 1-2 are external views showing left side and front side of the pocket computer of the present invention.

FIG. 2 shows an exploded view of a telephone input jack of the prior art.

FIG. 7-1 is a schematic view of the cover body in an open state;

FIG. 7-2 is a schematic view of the press device with its fastening action in progress; and FIG. 7-3 is a schematic view of the press device with its fastening action being brought to completion.

FIG. 12 shows schematic views of the pivotal shaft with its swivel section at work, in which:

FIG. 12-1 is a schematic view of the cover body in a closed state; and

FIG. 12-2 is a schematic view of the cover body in an opened state.

FIG. 14-1 shows a top view of the structure of the press key as shown in FIG. 13.

FIG. 14-2 shows a cut-away view of the press key as shown in FIG. 13.

FIG. 14-3 shows a schematic view of a numerical symbol exhibited on the top surface of the entry key as shown in FIG. 14-2.

FIG. 15-1 is a side sectional view of the entry key as shown in FIG. 15.

FIG. 15-2 is a front sectional view of the entry key as shown in FIG. 15.

DETAILED DESCRIPTION OF THE PREFERRED EMBODIMENTS

Figure 6:
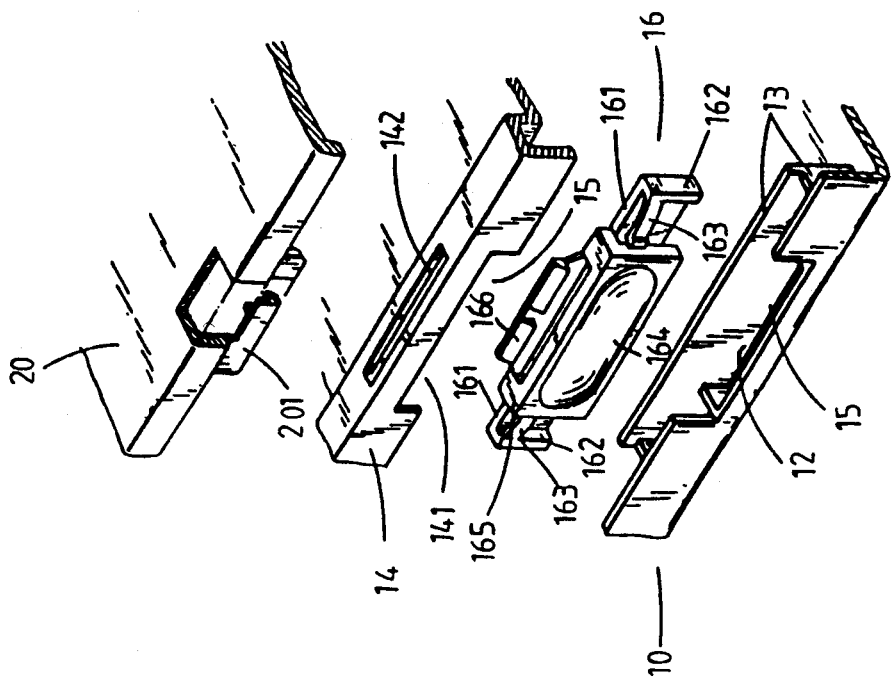
FIG. 6 shows an exploded view of the press device as shown in FIG. 5.
Figure 5:
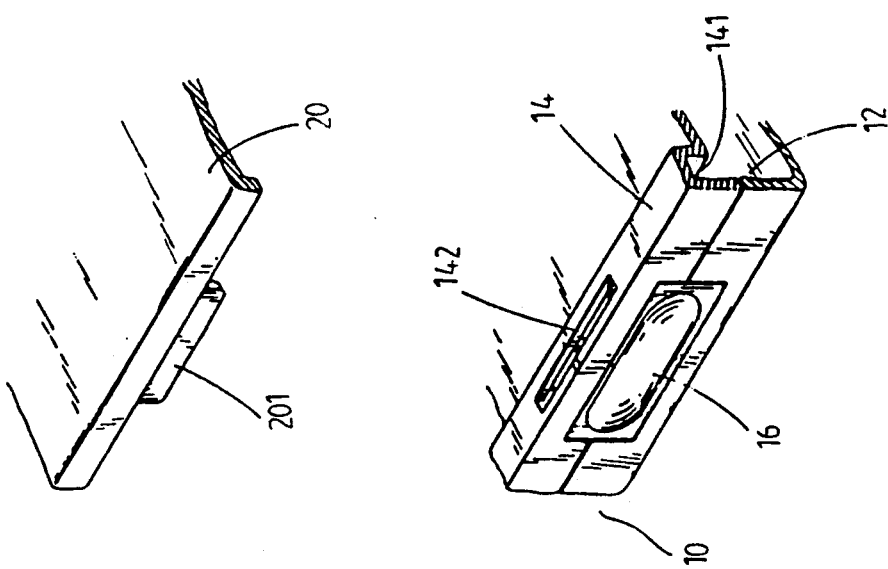
FIG. 5 shows an external three-dimensional view of a simple press device for opening and closing the cover body of the pocket computer of the present invention.

Referring to FIGS. 5 and 6, the main body 10 of the pocket computer embodied in the present invention is shown comprising in the front edge thereof an insertion space 12 which is made up of an enclosing wall 13 of appropriate width and depth. In addition, the insertion space 12 is capped with a suppressing casing 14 having an upper concave space 141 located correspondingly with the insertion space 12. A press hole 15 is located at the front edge of the upper concave space 141 while a hook entry hole 142 is arranged in the top surface of the upper concave space A fastening element 16 is so designed as to fit into the insertion space 12 and is composed of support piece 161 affixing securely to the enclosing wall 13 in such a manner that the fastening element 16 is supported securely in the insertion space 12. The support piece 161 comprises extended edges 162 located respectively at both ends thereof and cambered bracing pieces 163 located respectively at the front edges of the extended edges 162. A press body 164 is arranged between the two thin bracing pieces 163 in such manners that the press body 164 and the support piece 161 are spaced apart appropriately and that the press body 164 is allowed to emerge outwardly through the press hole 15. Furthermore, the press body 164 comprises an extended support face 165 located inwardly on the top edge thereof The extended support face 165 is, in turn, composed of the hook retaining piece 166 facing upwardly and outwardly in such a manner that the position of the hook retaining piece 166 corresponds with the position of the hook entry hole 142.

The cover body 20 comprises at a front edge thereof a hooked piece 201, which is positioned correspondingly to the hook entry hole 142 so as to permit the hook of the hooked piece 201 to engage with the hook retaining piece 166 via the hook entry hole 142.

Figure 1:
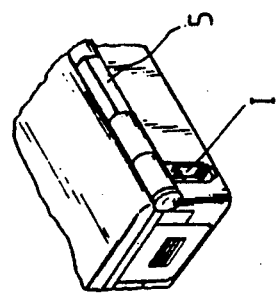
FIG. 1 shows an external three-dimensional front view of the pocket computer of the present invention.
Figure 1:
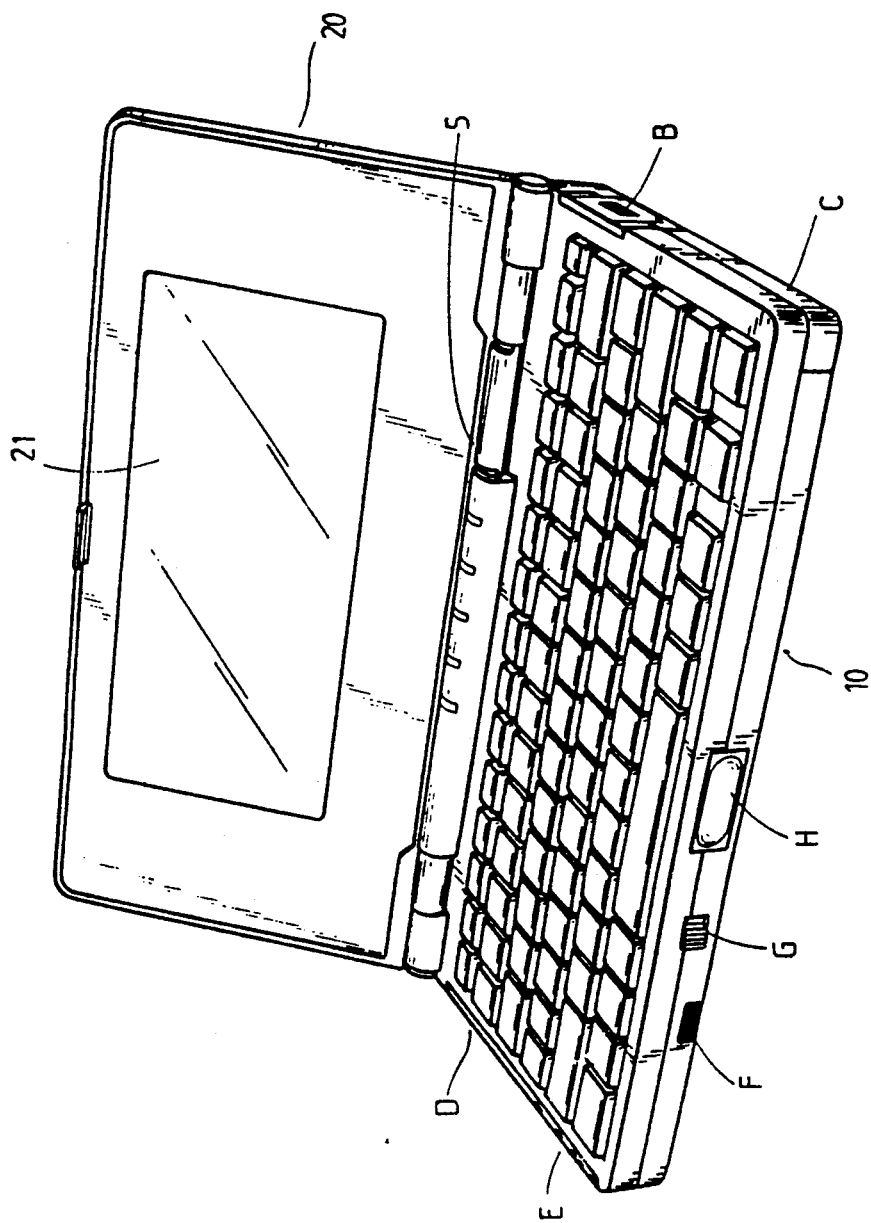
Figures 1, 2:
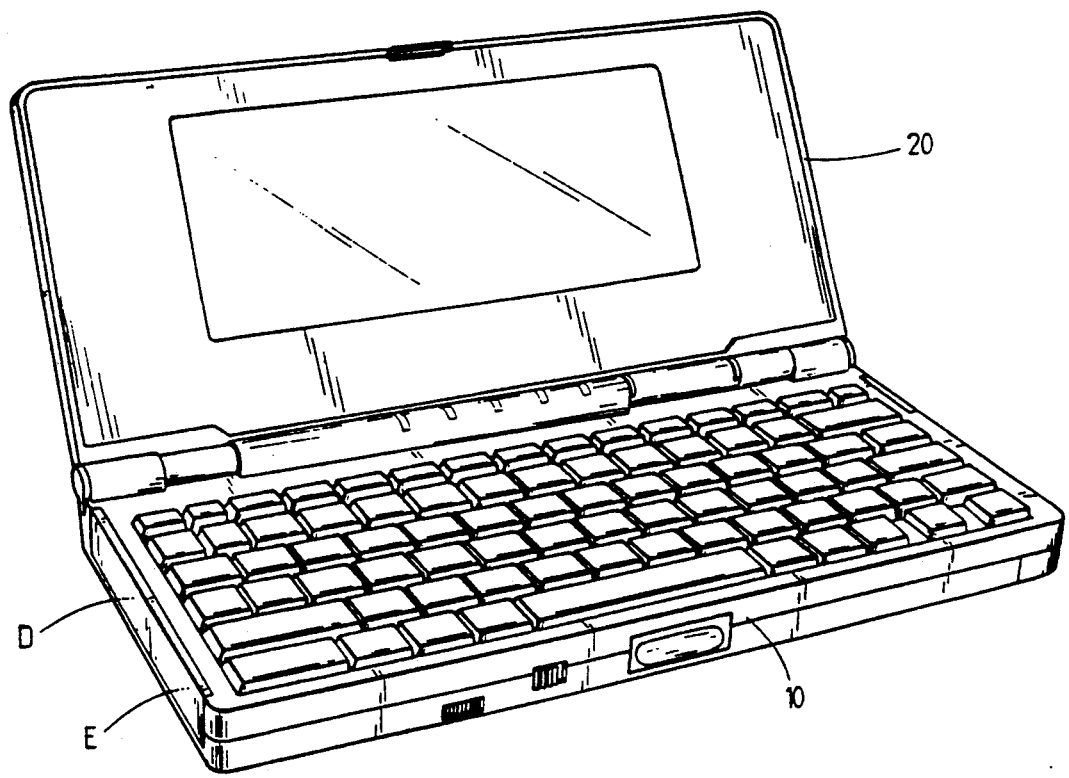
Figure 2:
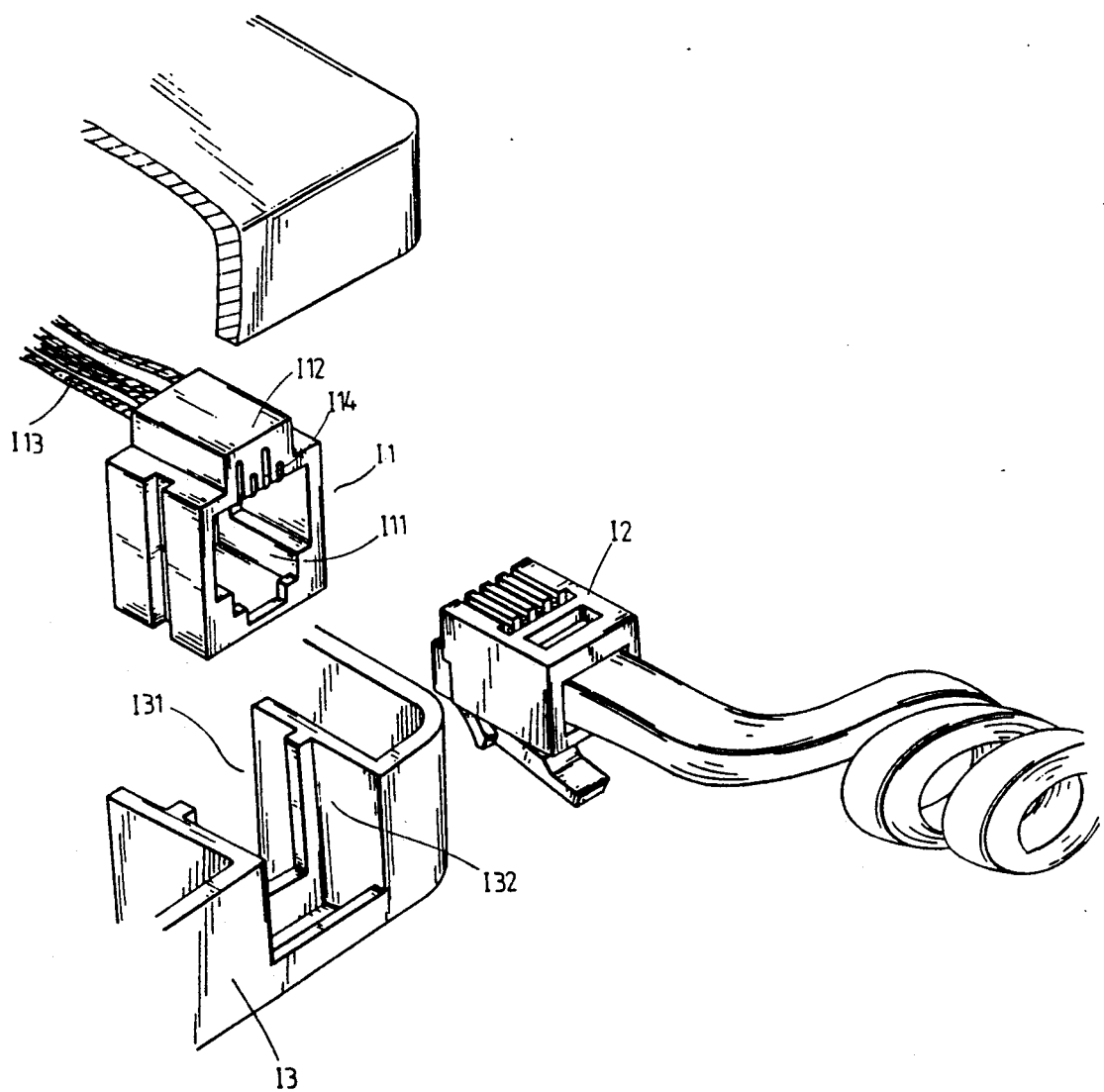
Figure 4:
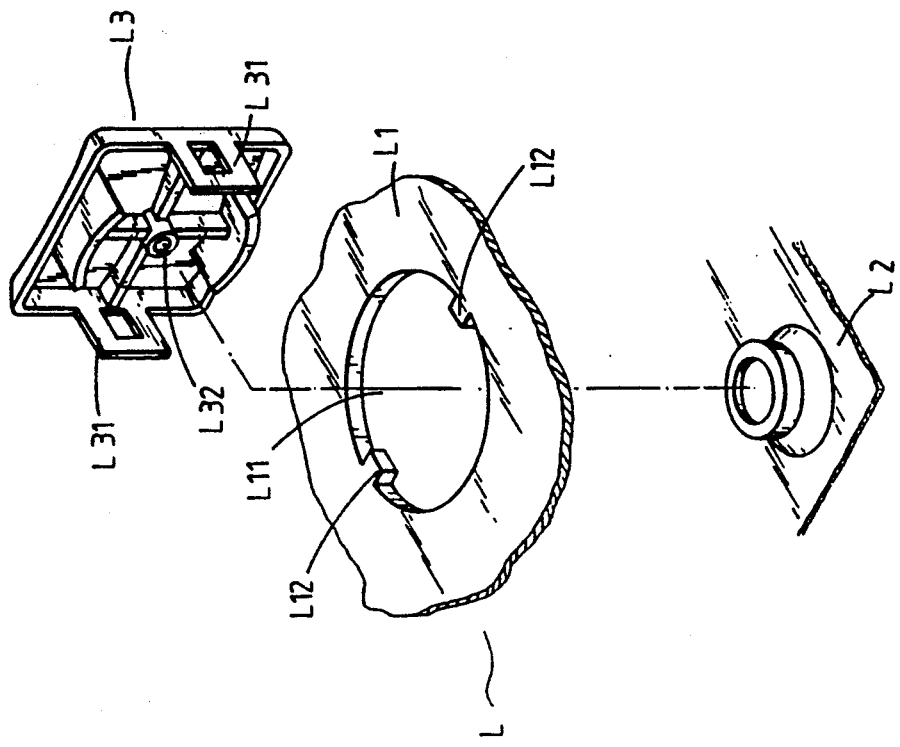
FIG. 4 shows an exploded view of the structure of the press key of computer keyboard according to the prior art.
Figure 3:
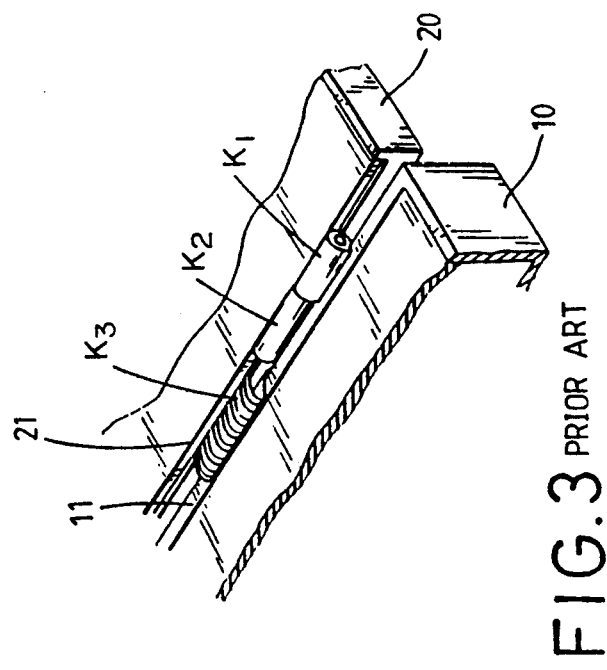
FIG. 3 shows a schematic view of the structure of the pivotal shaft coupling the main body and the cover body of a pocket computer of the prior art.
Figures 3, 7:
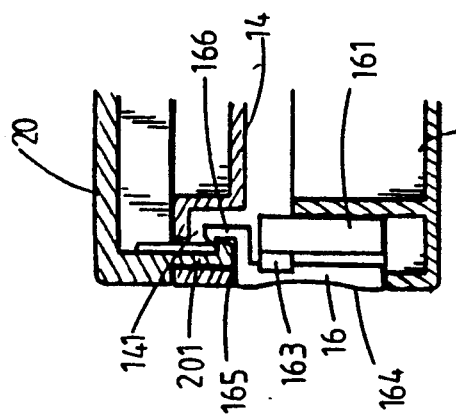
Figures 2, 7:
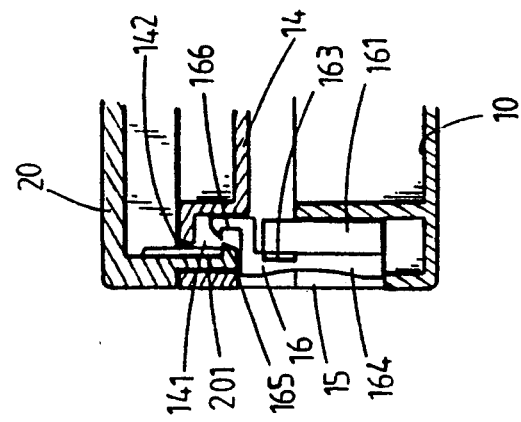
Figures 1, 7:
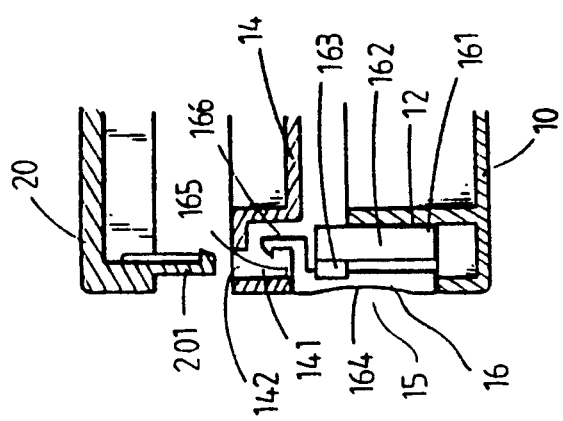

Now referring to FIGS. 7-1, 7-2 and 7-3, the cover body 20 is shown being lifted and remaining in an open position. Since the press body 164 of the fastening element 16 is not under the stress, and moves relative with respect to support piece 116 so that it leans forward, as shown in FIG. 7-1 In the process of moving the cover body 20 to be in a closed position, the urging effect of the hooked piece 201 against the hook retaining piece 166 causes the press body 164 to move backwardly, as shown in FIG. 7-2. As soon as the cover body 20 is completely brought to a close position, the elastic force of the bracing piece 163 exerts on the press body 164 so that the press body 164 moves to actuate the hook retaining piece 166 to engage with the hooked piece 201 in order to ensure that the cover body 20 remains securely in a closed position, as shown in FIG. 7-3.

The cover body 20 can be opened by pushing the press body 164 inwardly through the press hole 15 so as to cause the hooked piece 201 to disengage from the hook retaining piece 166.

Figure 8:
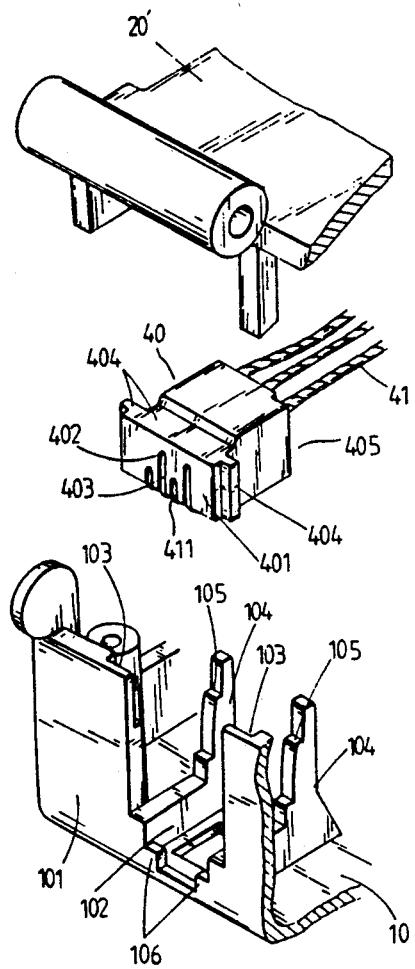
FIG. 8 shows an exploded view of the telephone input jack of the present invention.
Figure 9:
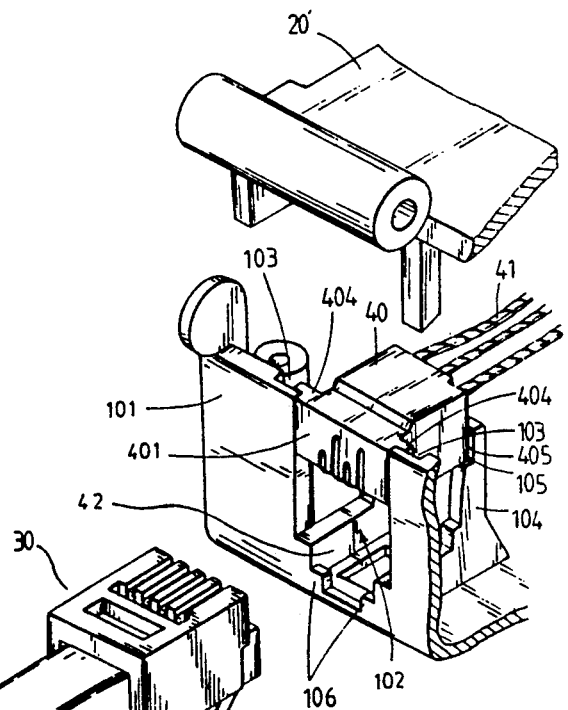
FIG. 9 shows an exploded view of the telephone input jack of the present invention, with its connection terminal body being inserted into the jack guide slot.

Now referring to FIGS. 8 and 9, the main body 10 of the pocket computer of the present invention is shown comprising a telephone input jack located in the side wall 101 thereof. The telephone input jack comprises therein an insertion guide hole 102, which is in turn composed of an open space located at the upper portion thereof. Two corresponding recess receptacles 103 of an appropriate depth are constructed in the inner wall of the open space of the insertion guide hole 102. Located at the appropriate locations in the insertion guide hole 102 and deeper into the main body 10 are two support frames 104 which comprise respectively a baffle 105. In addition, restrictors 106 are disposed at the front edge of the bottom surface of the insertion guide hole 102 to confine the telephone plug 30.

A terminal body 40 is provided with an appropriate number of signal cables 41 entering thereinto from the rear end thereof. The signal cable cores 411 emerge from the core exits 402 located in the front face 401 of the terminal body 40 and subsequently travel downwardly and then backwardly to form, on the surface of the terminal body 40, parallel guide channels 403 which correspond in number to signal cables 41. Each of signal cable core 411 is bent appropriately in the direction toward the corresponding guide channel 403 and is subsequently guided to extend itself downwardly and then backwardly. Located at both sides of the front end of terminal body 40 are two arrest wings 404, which are designed to fit into the recess receptacles 103 of the main body 10. The terminal body 40 is arranged in such a manner that its front face 401 and the side wall 101 of the main body 10 are aligned on the same plane and that its tail end 405 is appropriately received on the baffles 105 of the support frame 104 of the main body 10. As a result, there is a space 42 formed in the insertion guide hole 102 just under the terminal body 40. The space 42 is designed so as to permit a telephone plug 30 to fit thereinto. In addition, a stabilizer 20' is used to help hold the terminal body 40 securely in place.

The telephone input jack of the present invention described above is devoid of a square seat body and the receiving room to accommodate therein the square seat body, which are all integral parts of a conventional telephone input jack of the prior art. It is readily apparent that the telephone input jack of the present invention is structurally simpler and is greatly reduced in size. As a result, the telephone input jack of the present invention can be manufactured at a faster pace, with reduced amount of materials used, with less involvement of manufacturing processes and above all, at a lower cost.

Figure 10:
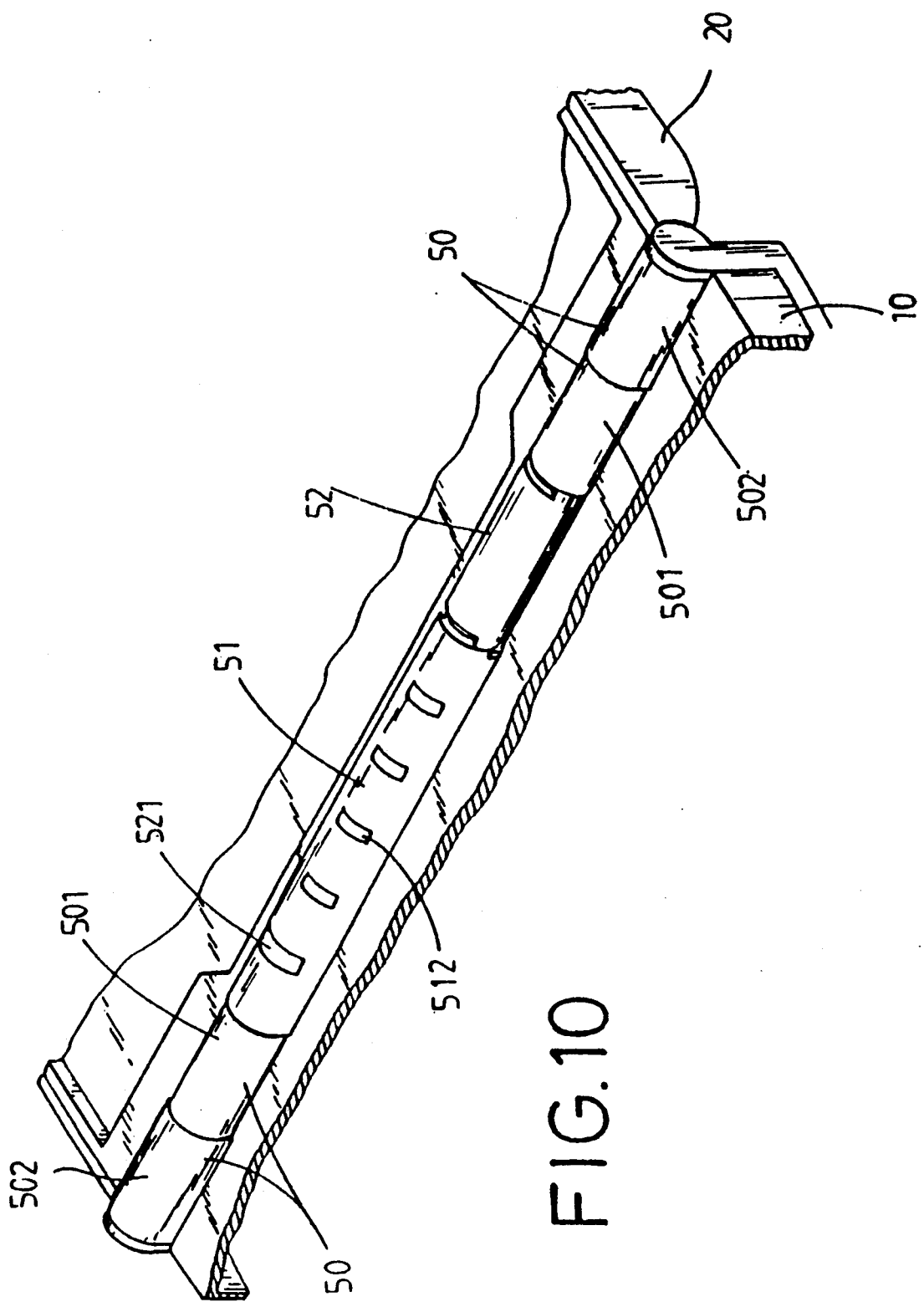
FIG. 10 shows an external three-dimensional view of the pivotal shaft of the preferred embodiment in accordance with the present invention.
Figure 11:
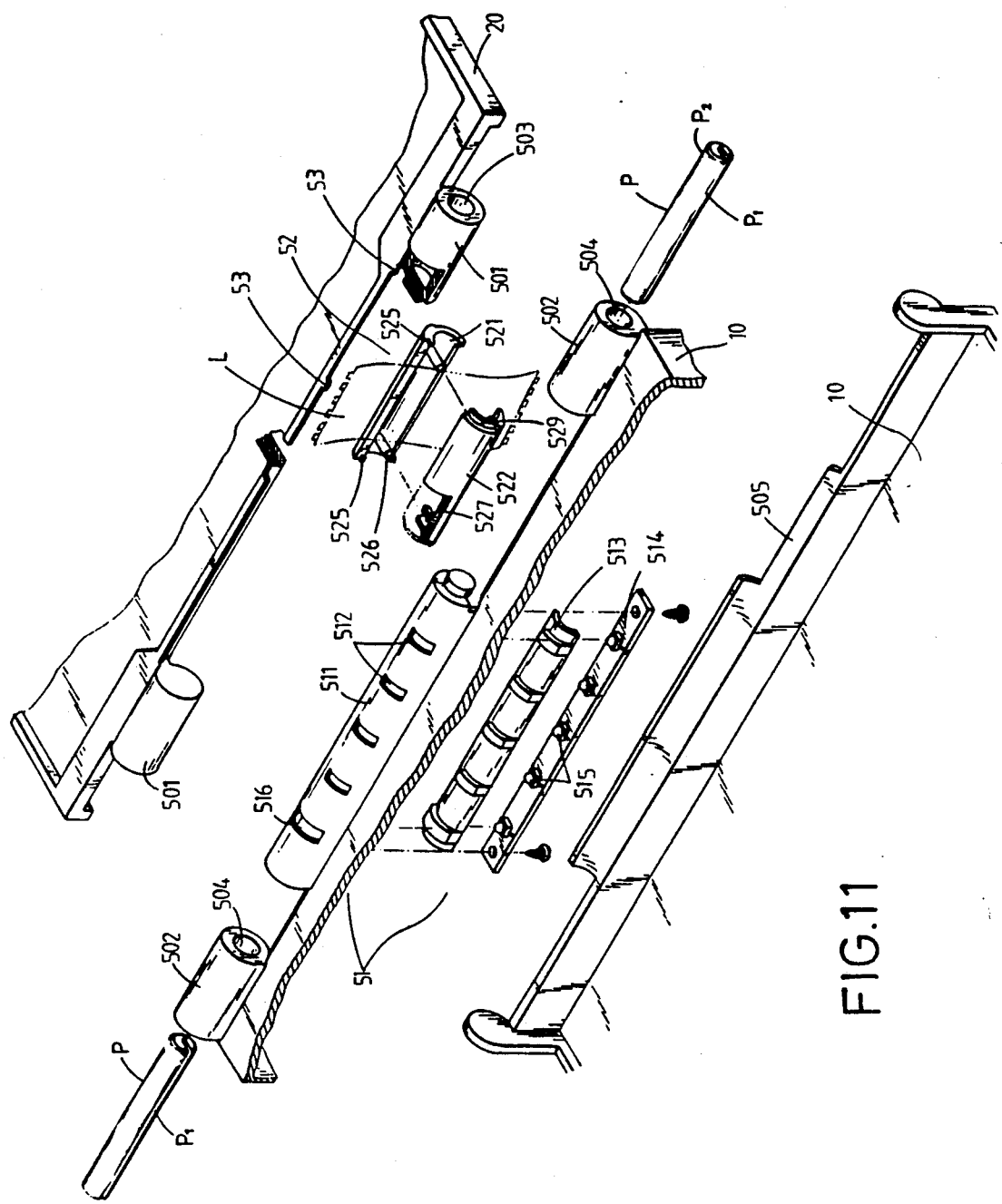
FIG. 11 shows an exploded view of the pivotal shaft as shown in FIG. 10.

Now referring to FIGS. 10 and 11, the pivotal shaft of the present invention is shown comprising pivotal portions 50, function exhibiting section 51, an swivel sections 52.

The pivotal portions 50 comprise respectively pivotal ear pieces 501 and 502 located appropriately near the edges of cover body 20 adjacent to a pivotal shaft and the edges of main body 10 adjacent to pivotal a shaft. The pivotal ear pieces 501 and 502 are provided respectively with pivotal through holes 503 and 504, which communicate with each other. The pivotal ear pieces 501 and 502 further include respectively a column pin P, which is dimensioned to fit into the pivotal through holes 503 and 504 with an appropriate tightness and is provided thereon with axial threads P2 for enhancing the effect of mechanical friction between the column pin P and the pivotal through holes 503 and 504 and is further composed of tangential grooves P1 of appropriate depth arranged thereon at an appropriate interval to ensure that the column pin P maintains an appropriate expansibility after being fitted into the pivotal through holes 503 and 504. Accordingly, it is suggested that the column pin P be made of abrasion-proof synthetic materials such as are available under the trademarks DURACON and POM.

The function exhibiting section 51 comprises a shaft-like cover piece 511 arranged at the edge of main body 10 adjacent to pivotal shaft. The cover piece 511 is provided with an appropriate number of light perforations 512. Located under the cover piece 511 is a transparent cover plate 513, under which there is an indicator plate 514 of a light-emitting diode (LED) having thereon indicator lights 515 positioned correspondingly to light perforations 512. The electronic signal that actuates the indicator light 515 comes from the operation of the computer. For example, the start of the computer power source or the actuation of any specific functional key of the keyboard can be so indicated by the indicator light 515. Furthermore, the warning light perforation 516, which is in fact an enlarged light perforation 512, remains visible when the cover body 20 is closed and is used to alert the operator to shut off the power source of the computer not in use.

Figure 12:
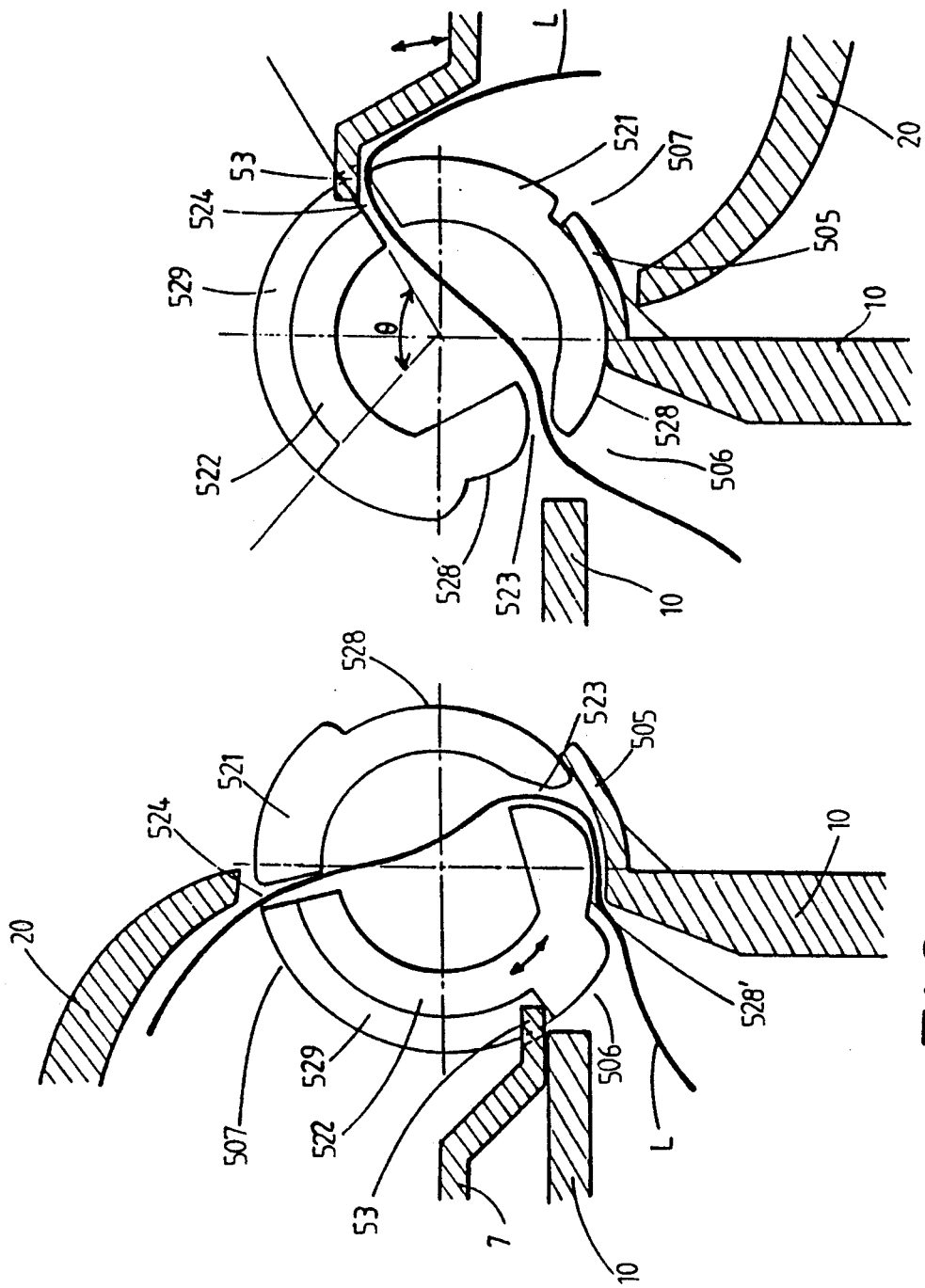
Figure 13:
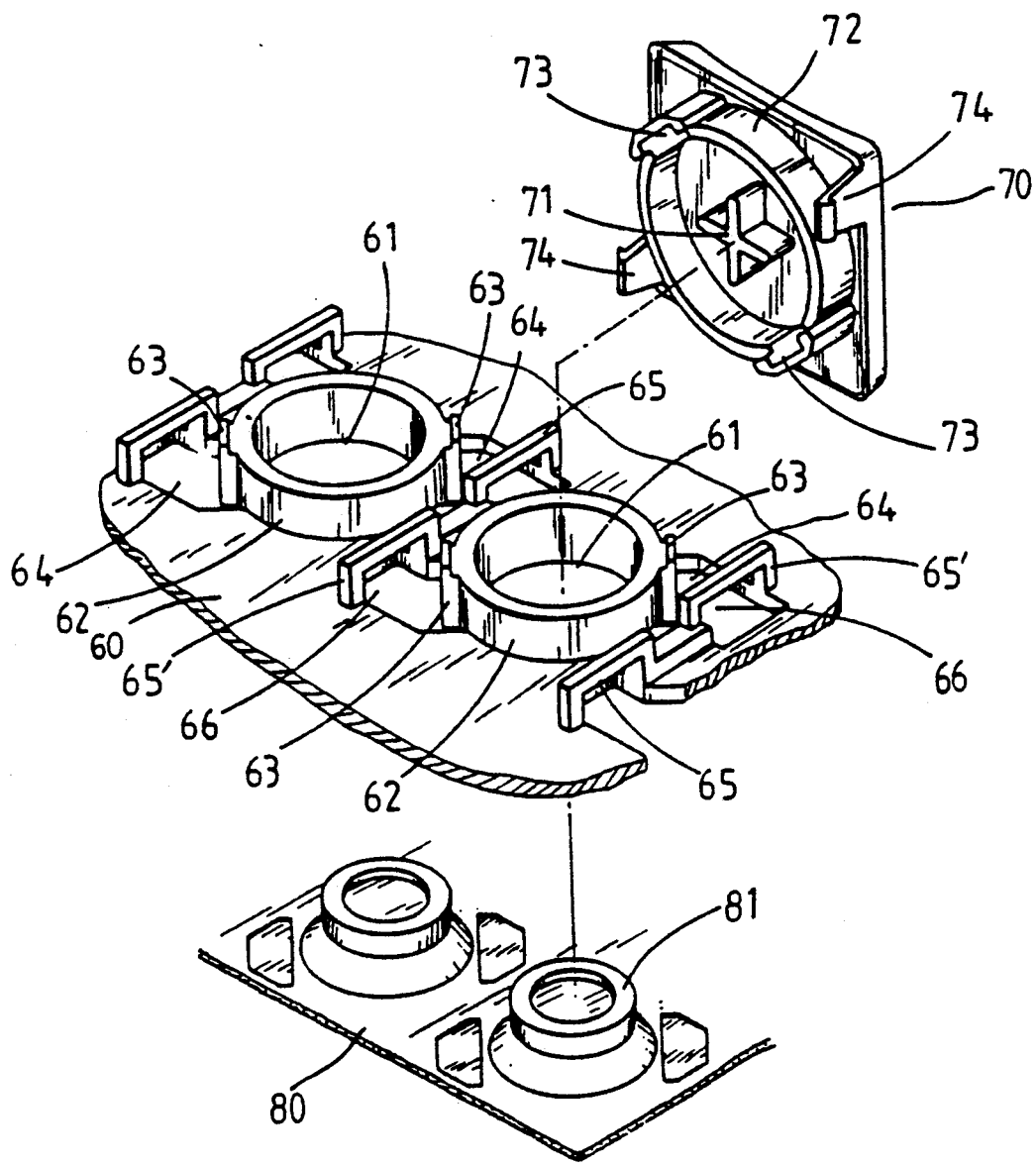
FIG. 13 shows an exploded view of the press key of the computer keyboard of the preferred embodiment in accordance with the present invention.

The swivel section 52 is arranged between the pivotal portion 50 and the function exhibiting section 51 and is composed of an outer swivel piece 521 and an inner swivel piece 522, which are of semi-circular construction and are brought together to form a shaft-like swivel section 52 by means of connection pins 526 and pin mounts 527 in conjunction with application of an appropriate adhesive agent. However, there are substantial gaps 523 and 524 formed between the outer swivel piece 521 and the inner swivel piece 522, as shown in FIGS. 12-1 and 12-2. These gaps 523 and 524 are formed by virtue of protrusions 525 disposed on the edges of either outer swivel piece 521 or inner swivel piece 522 for the purpose of permitting a communication cable set L to pass through. A portion of the outer surface of outer swivel piece 521 is constructed as a recessed surface 528 which is designed to be accommodated fittingly by the receiving edge 505 of the main body 10 during the process of assembling the pocket computer of the present invention. In a similar way, a portion of the outer surface of inner swivel piece 522 forms a recessed surface 528' which is slightly deeper than the recessed surface 528 of outer swivel piece 521. The outer surface of inner swivel piece 522 is additionally provided with a delay swivel groove 529 which is constructed with the range of the angle 0 to permit the wrenching piece 53 located under the cover body 20 to be inserted thereinto during the process of assembling the pocket computer of the present invention.

The communication cable set L linking electronically the cover body 20 and the main body 10 is arranged in such a manner that it first emerges from the edge opening 506 adjacent to the main body 10 to enter the gap 523 in order to pas between the outer swivel piece 521 and the inner swivel piece 522 to reemerge subsequently from the gap 524 to enter the interior of the cover body 20 from the edge opening 507 adjacent to the cover body 20. As a result, the communication cable set L is not exposed, thereby resulting in improving the aesthetic effect of the pocket computer of the present invention.

Furthermore, in the process of opening and closing the cover body 20, the wrenching piece 53 triggers the swivel pieces to turn only after it has completed traveling through the range of the $\theta$ angle in the delay swivel groove 529, thereby bringing about a substantial reduction in the extent of bending of the communication cable set L. The breakage of the communication cable set L caused by fatigue is thus effectively avoided.

Referring to FIG. 13 and FIG. 14-1 to 14-3, the housing plate 60 of the keyboard of the present invention is shown comprising a plurality of key tubular holes 61 arranged thereon in sequence. Each of the key tubular holes 61 is provided with a tubular flange 62 of an appropriate height along the circumference thereof. The tubular flange 62 of each key tubular hole 61 comprises two slide keys 63 disposed oppositely at the positions located on an opposite angular line of the tubular flange 62 corresponding to the entry key 70. The housing plate 60 further comprises regulation slots 64 of an appropriate shape located at the positions corresponding to the slide keys 63. Located on another opposite angular line of the tubular flange 62 corresponding to the entry key 70 and at an appropriate distance from the tubular flange 62 are two corresponding hook retaining ears 65. Located under each of the hook retaining ears 65 is a retreat hole 66 which is adjacent to the regulation slot 64 or communicates with the regulation slot 64.

A rubber diaphragm 80 comprises thereon a plurality of elastic floating capsules 81, each of which is lodged in the key tubular hole 61

The entry key 70 consists of a suppressing column 71 located at the center of the bottom surface thereof. The entry key 70 is joined with the housing plate 60 in such a manner that the suppressing column 71 of the entry key 70 presses against the top of the floating capsule 81. The entry key 70 further comprises an enclosing flange 72 of circular construction located at the bottom surface thereof. The enclosing flange 72 is dimensioned to accommodate therein the tubular flange 62 of the housing plate 60. The entry key 70 still further comprises two slide key mounts 73, which are disposed at the opposite angular positions on the enclosing flange 72 and are positioned correspondingly to slide keys 63 of the tubular flange 62 so that the slide key mounts 73 engage with the slide keys 63, Finally, the entry key 70 is provided on the corner edges of bottom surface thereof with two hooks 74, which are disposed at other opposite angular positions corresponding to the hook retaining ears 65 of the housing plate 60. The hooks 74 of the entry key 70 engage the hook retaining ears 65 of the housing plate 60, when the entry key 70 is joined with the housing plate 60.

The association of the entry key 70 with the housing plate 60 and the rubber diaphragm 80 embodied in the present invention is characterized in that the stability of the up-and-down movement of the entry key 70 is accomplished with certainty by the engagement of the slide key mounts 73 of the entry key 70 with the slide keys 63 of the housing plate 60, and that the possible detachment of the entry key 70 from the housing plate 60 i effectively averted by virtue of the fastening action of hooks 74 of the entry key 70 and the hook retaining ears 65 of the housing plate 60. In addition, slide keys 63, slide key mounts 73, hooks 74, and hook retaining ears 65 are all disposed at the positions located respectively on the opposite angular lines, and any given regulation slot 64 for an entry key 70 is located in such a way that it communication with the retreat hole 66 adjacent to regulation slot 64 associated with another entry key 70. As a result, the spacing distance between the two entry keys 70 can be reduced appropriately so that the over-all size of the keyboard of the present invention is reduced to the extent that it coincides with the size of the pocket computer.

The arrangement of slide keys 63, slide key mounts 73, hook retaining ears 65, and hooks 74 can be modified to achieve the same technical advantages described above. For example, slide keys 63 and hook retaining ears 65 can be disposed on the entry key 70 while slide key mounts 73 and hooks 74 can be disposed on the housing plate 60.

Figures 1, 14:
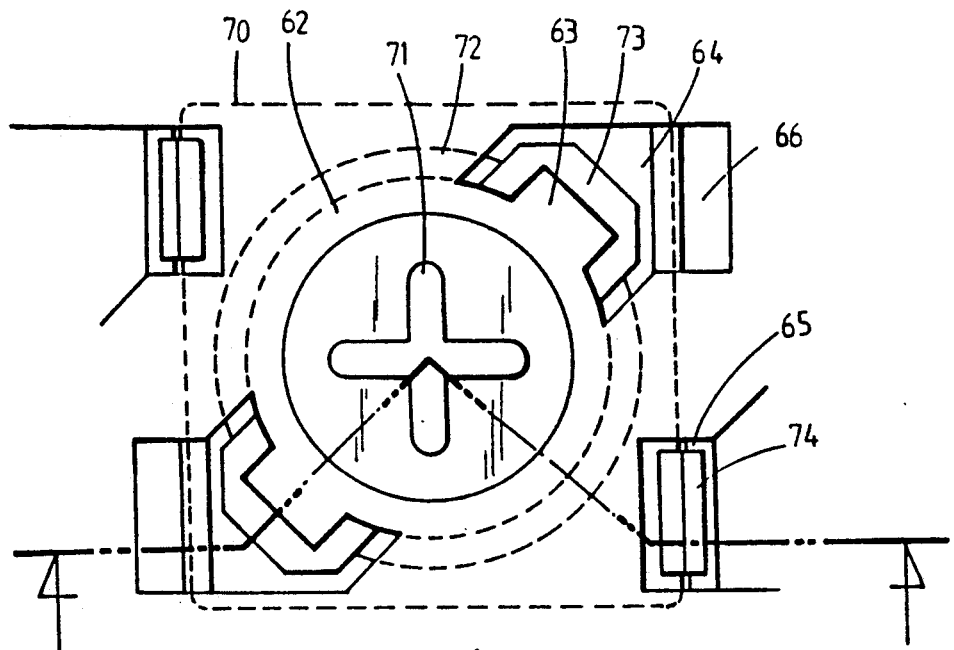
Figures 3, 14:
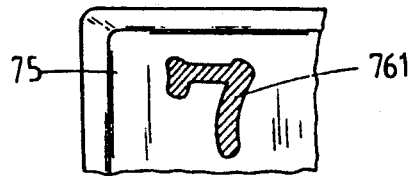
Figures 2, 14:
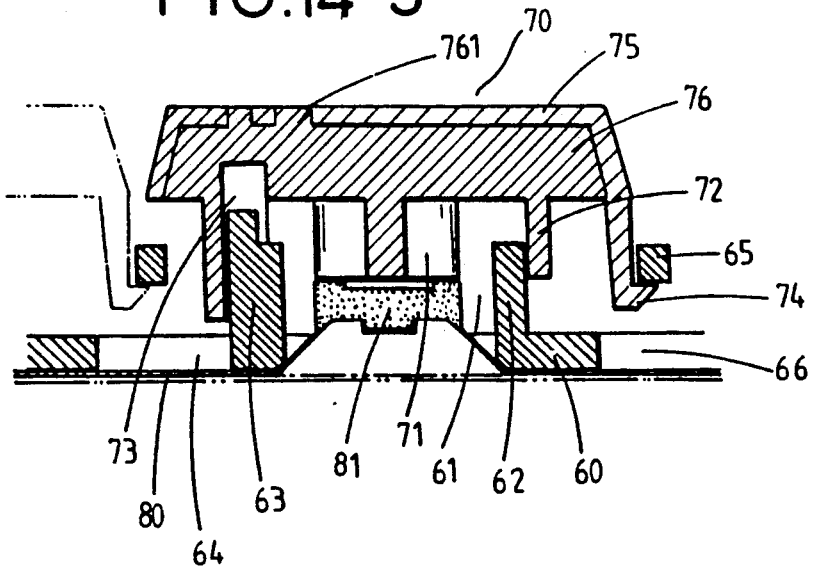

As shown in FIGS. 14-2 and 14-3, the entry key 70 of the present invention comprises thereon a alphanumerical marking 761. The upper surface of the entry key 70 is composed of face plate 75 and sole plate 76, which are made of abrasion-proof materials of different colors, such synthetic materials available under the trademarks DURACON and POM. The alphanumerical marking 761 is done on the sole plate 76 and is shown through the face plate 75. Therefore, the marking 761 of the entry key 70 will not be faded away by constant touch of the user's finger. In addition, the sole plate 76 is made of a self-lubricating material so as to ensure that any obstruction of up-and-down motion of the entry key 70 does not take place.

Figures 1, 15:
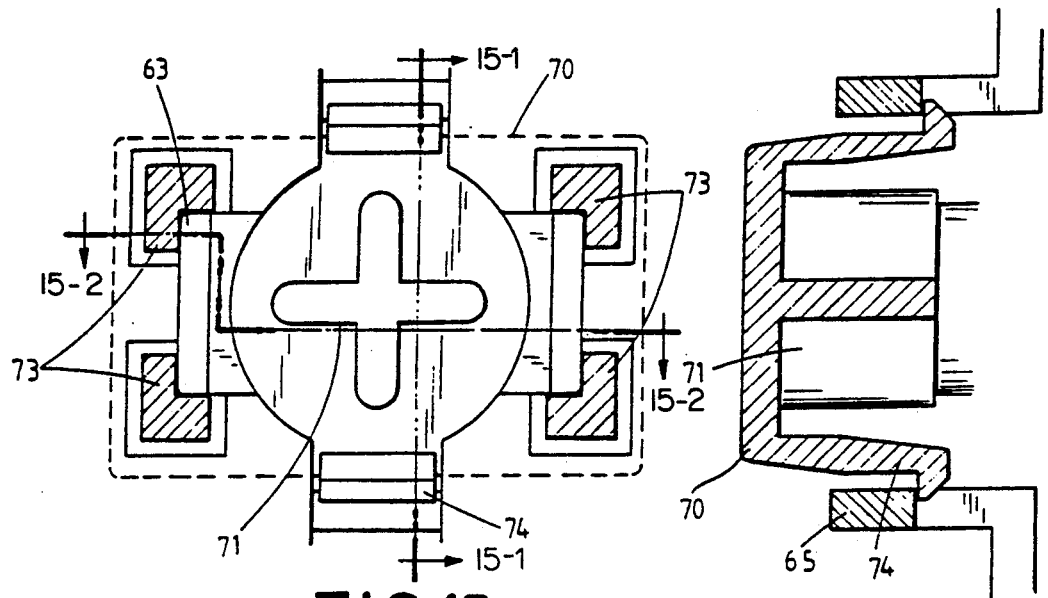
FIG. 15 shows a top schematic view of the entry key of another preferred embodiment of the present invention.
Figures 2, 15:
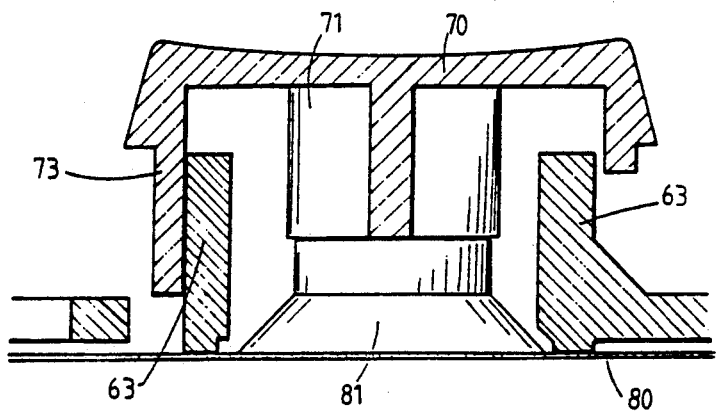

As shown in FIGS. 15, 15-1, and 15-2, slide keys 63, slide key mounts 73, hooks 74, and hook retaining ears 65 can be all arranged at the positions located on each side of the rectangular entry key 70 to achieve the same advantages described above.

As previously described, the pressing and fastening means of the pocket computer of the present invention is characterized in that it is of relatively simple construction, and that it is devoid of any elastic element, and further that it is small in size so as to occupy only a very limited space. In addition, the overall structure of the telephone input jack of the pocket computer of the present invention is effectively miniaturized and simplified so that it can be easily replaced or repaired. Accordingly, the cost of producing the pocket computer of the present invention is substantially reduced.

The pivotal shaft of the pocket computer of the present invention is designed so as to give the cover body a good support at an opening angle and is provided with a function exhibiting section to monitor the status of operation of the computer. Furthermore, the pivotal shaft of the pocket computer of the present invention comprises a swivel section, which conceals the communication cables linking electronically the cover body with the main body and prevents the communication cables mentioned above from being bent in the process of opening and closing the cover body. The advantages of the pivotal shaft of the pocket computer of the present invention over a pivotal shaft of the prior art are readily apparent.

The keyboard of the pocket computer of the present invention is uniquely designed to make full use of the available space between the entry keys and the key housing plate making up the keyboard and to ensure that entry keys are securely anchored in place. The entry keys of the present invention ar different from those of the prior art in that they are made up of a face plate and a sole plate, which are of different colors. Therefore, unlike the prior art entry keys upon which alphanumerical markings are directly printed, the entrykeys of the present invention comprise alphanumerical markings which can not be gradually erased and will not fade by constant touch of the fingers of the user.

The embodiments of the present invention described above are to be considered in all respects as merely illustrations of principles of the present invention. Accordingly, the present invention is to be limited only by the scope of the hereinafter appended claims.

What I claim is:

1. A body structure for a pocket computer comprising
    a main body housing,
    a cover body,
    fastening means having an elastic fastening element accommodated in an insertion space located at a front edge of the main body housing for fastening said main body housing and said cover body, with multiple elements of said elastic fastening element being spaced apart and being coupled with one another by a support piece, said fastening means further including a hook retaining piece located on the main body housing to hook a hooked piece located correspondingly on the cover body.

2. A body structure for a pocket computer according to claim 1, wherein said insertion space is defined by a wall of said main body housing and said insertion space is capped by a suppressing casing with a hole located correspondingly with an upper portion of said insertion space permitting said hooked piece to insert thereinto, said insertion space and said suppressing casing forming jointly a press hole located at a front edge thereof.

3. A body structure for a pocket computer according to claim 2, wherein said suppressing casing is provided with a recess located correspondingly with said insertion space, said recess including a hole located at a top surface thereof to permit said hooked piece to insert thereinto, said recess and said insertion space comprising a press hole at a front edge thereof.

4. A body structure for a pocket computer according to claim 1, wherein said support piece is capable of being held securely to the wall of said insertion space and comprising extended edges located respectively at front edges of both ends thereof, said extended edges being provided with cambered bracing pieces, with a press piece being formed between said bracing pieces and with said support piece.

5. A body structure for a pocket computer according to claim 4, wherein said press piece comprises an extended support face inwardly disposed at a top edge thereof, said extended support face including said hook retaining piece which faces outwardly and is disposed upwardly at a rear edge of said support face, said hook retaining piece being located corresponding to the insertion hole of said hooked piece.

6. A body structure for a pocket computer according to claim 1, wherein a telephone input jack is located in a side wall of said main body housing and includes an insertion guide hole consistent with a profile of the telephone input plug, said insertion guide hole includes insertion mounts to support thereof a terminal body and has a hole in conjunction with a bottom surface of said terminal body to receive therein said telephone input plug.

7. A body structure for a pocket computer according to claim 6, wherein said insertion guide hole has an open upper portion with two corresponding recess receptacles and support frames disposed therein, said support frames includes baffles, wherein said insertion guide hole further comprises restrictors disposed at an inner bottom surface thereof, and wherein said insertion guide hole and said terminal body are provided with stabilizers disposed at upper portions thereof.

8. A body structure for a pocket computer according to claim 6, wherein said terminal body is provided with signal cables entering thereinto from a rear end thereof, said signal cables having cores emerging from core exits located in a front face of said terminal body and extending downwardly and backwardly to define, on a surface of said terminal body, parallel guide channels which correspond in number with said signal cables, and each of said signal cables is bent appropriately in a direction toward said guide channel and is subsequently guided to extend downwardly and backwardly; wherein said terminal body further comprises two arrest wings located at both sides of a front end thereof and fit into recess receptacles of the main body; and wherein said terminal body in arranged so that its front face and a side wall of said main body are aligned in a same plane and that a tail end of said terminal body is received on a baffle of a support frame of said main body.

9. A body structure for a pocket computer according to claim 6, wherein a pivotal shaft is disposed between the main body and the cover body and provided with pivotal portions having pivotal ear pieces located near the edges of said cover body adjacent to said pivotal shaft, said pivotal ear pieces being provided respectively with pivotal through holes which communicate with each other, with each of said pivotal ear pieces comprising therein a column pin dimensioned to fit into said pivotal through hole with an appropriate tightness.

10. A body structure for a pocket computer according to claim 6, wherein a keyboard is made up of a housing plate and a plurality of entry keys, said housing plate being provided with a plurality of key tubular holes arranged thereon in sequence, with each of said key tubular holes including a tubular flange, said tubular flange having slide keys disposed oppositely at the positions located on an opposite angular line thereof and hook retaining ears disposed on another opposite angular line thereof; said entry key being composed of a suppressing column located at a center of a bottom surface thereof and an enclosing flange of circular construction located at the bottom surface thereof and dimensioned to accommodate therein said tubular flange of said housing plate, said entry key further comprising slide key mounts and hooks, said slide key mounts are disposed at the opposite angular positions on said enclosing flange and are positioned correspondingly to said slide keys of said tubular flange so that said slide key mounts engage with said slide keys, and hooks are disposed at positions located on another opposite angular line thereof to correspond position-wise to said hook retaining ears of said housing plate.

11. A body structure for a pocket computer according to claim 1, wherein a pivotal shaft is disposed between the main body and the cover body and provided with pivotal portions having pivotal ear pieces located near edges of said cover body adjacent to said pivotal shaft, said pivotal ear pieces being provided respectively with pivotal through holes which communicate with each other, with each of said pivotal ear pieces comprising therein a column pin dimensioned to fit into said pivotal through hole.

12. A body structure for a pocket computer according to claim 11, wherein said pivotal shaft further comprises a function exhibiting section provided with indicator lights for monitoring the operation of electronic devices of the pocket computer.

13. A body structure for a pocket computer according to claim 12, wherein said function exhibiting section is provided with a cover piece arranged at the edge of the main body adjacent to said pivotal shaft, said cover piece comprising light perforations; and wherein said function exhibiting section is further provided with a transparent cover plate located under said cover piece, under which there is an indicator plate having thereon indicator lights positioned correspondingly to the light perforations.

14. A body structure for a pocket computer according to claim 13, wherein said cover piece comprises an enlarge light perforation which remains visible when the cover body is closed.

15. A body structure for a pocket computer according to claim 11, wherein said column pin is provided thereon with axial threads.

16. A body structure for a pocket computer according to claim 15, wherein a keyboard is made up of a housing plate and a plurality of entry keys, said housing plate being provided with a plurality of key tubular holes arranged thereon in sequence, with each of said key tubular holes including a tubular flange, said tubular flange having slide keys disposed oppositely at the positions located on an opposite angular line thereof and hook retaining ears disposed on another opposite angular line thereof; said entry key being composed of a suppressing column located at a center of a bottom surface thereof and an enclosing flange of circular construction located at the bottom surface thereof and dimensioned to accommodate therein said tubular flange of said housing plate, said entry key further comprising slide key mounts and hooks, said slide key mounts are disposed at the opposite angular positions on said enclosing flange and are positioned correspondingly to said slide keys of said tubular flange so that said slide key mounts engage with said slide keys, and hooks are disposed at positions located on another opposite angular line thereof to correspond position-wise to said hook retaining ears of said housing plate.

17. A body structure for a pocket computer according to claim 12, wherein said pivotal shaft comprises a swivel section which is composed of an outer swivel piece and an inner swivel piece, at least one of said outer swivel piece and said inner swivel piece having thereon protrusions to form gaps located therebetween to permit a communication cable set linking the main body with the cover body to pass therethrough.

18. A body structure for a pocket computer according to claim 17, wherein said swivel section is additionally provided with a delay swivel groove to permit a wrenching piece located under the cover body to be inserted therein.

19. A body structure for a pocket computer according to claim 18, wherein said delay swivel grooves are disposed at both ends of said swivel section.

20. A body structure for a pocket computer according to claim 18, wherein said swivel section is pivotally mounted between a function exhibiting section and the pivotal portions.

21. A body structure for a pocket computer according to claim 17, wherein said swivel portion is made up of a semi-circular outer swivel piece and a semi-circular inner swivel piece, at least one of said outer swivel piece and said inner swivel piece having protrusions disposed on edges thereof to form gaps permitting a communication cable set to pass therethrough.

22. A body structure for a pocket computer according to claim 21, wherein said inner swivel piece and said outer swivel piece are joined by connection pins and pin mounts which are located inside said swivel pieces so as to form a swivel section.

23. A body structure for a pocket computer according to claim 22, wherein said outer swivel piece has a portion on an outer surface thereof defining a recessed surface for fitting a receiving edge of the main body; wherein said inner swivel piece has a portion on an outer surface thereof defining a recessed surface which is slightly deeper than the recessed surface of said outer swivel piece; and wherein said inner swivel piece is additionally provided with a delay swivel groove to permit a wrenching piece located under the cover body to be inserted thereinto.

24. A body structure for a pocket computer according to claim 23, wherein said delay swivel grooves are disposed at both ends of said inner swivel piece.

25. A body structure for a pocket computer according to claim 21, wherein said outer swivel piece has a portion on an outer surface thereof defining a recessed surface for fitting a receiving edge of the main body; wherein said inner swivel piece has a portion on an outer surface thereof defining a recessed surface which is slightly deeper than the recessed surface of said outer swivel piece; and wherein said inner swivel piece is additionally provided with a delay swivel groove to permit a wrenching piece located under the cover body to be inserted thereinto.

26. A body structure for a pocket computer according to claim 20, wherein said swivel section is pivotally mounted between a function exhibiting section and the pivotal portions.

27. A body structure for a pocket computer according to claim 17, wherein said swivel section is pivotally mounted between a function exhibiting section and the pivotal portions.

28. A body structure for a pocket computer according to claim 1, wherein said pivotal shaft further comprises a swivel section which is composed of an outer swivel piece and an inner swivel piece, at least one of said outer swivel piece and said inner said swivel piece having thereon protrusions to form gaps located between said outer swivel piece and said inner swivel piece to permit a communication cable set linking the main body with the cover body to pass therethrough.

29. A body structure for a pocket computer according to claim 28, wherein said swivel section is additionally provided with a delay swivel groove to permit a wrenching piece located under the cover body to be inserted therein.

30. A body structure for a pocket computer according to claim 29, wherein said delay swivel grooves are disposed at both ends of said swivel section.

31. A body structure for a pocket computer according to claim 30, wherein said swivel section is pivotally mounted between a function exhibiting section and the pivotal portions.

32. A body structure for a pocket computer according to claim 29, wherein said swivel section is pivotally mounted between a function exhibiting section and the pivotal portions.

33. A body structure for a pocket computer according to claim 28, wherein said swivel portion is made up of a semi-circular outer swivel piece and a semi-circular inner swivel piece, at least one of said outer swivel piece and said inner swivel piece having protrusions disposed on edges thereof to form gaps permitting a communication cable set to pass therethrough.

34. A body structure for a pocket computer according to claim 33, wherein said inner swivel piece and said outer swivel piece are joined by connection pins and pin mounts which are located inside said swivel pieces so as to form a swivel section.

35. A body structure for a pocket computer according to claim 34, wherein said outer swivel piece has a portion on an outer surface thereof defining a recessed surface for fitting a receiving edge of the main body; wherein said inner swivel piece has a portion on an outer surface which is slightly deeper than the recessed surface of said outer swivel piece; and wherein said inner swivel piece is additionally provided with a delay swivel groove to permit a wrenching piece located under the cover body to be inserted thereinto.

36. A body structure for a pocket computer according to claim 35, wherein said delay swivel grooves are disposed at both ends of said inner swivel piece.

37. A body structure for a pocket computer according to claim 36, wherein said swivel section is pivotally mounted between a function exhibiting section and the pivotal portions.

38. A body structure for a pocket computer according to claim 34, wherein said swivel section is pivotally mounted between a function exhibiting section and the pivotal portions.

39. A body structure for a pocket computer according to claim 33, wherein said outer swivel piece has a portion on an outer surface thereof defining a recessed surface for fitting a receiving edge of the main body; wherein said inner swivel piece has a portion on an outer surface thereof defining a recessed surface which is slightly deeper than the recessed surface of said outer swivel piece; and wherein said inner swivel piece is additionally provided with a delay swivel groove to permit a wrenching piece located under the cover body to be inserted therein.

40. A body structure for a pocket computer according to claim 39, wherein said swivel section is pivotally mounted between a function exhibiting section and the pivotal portions.

41. A body structure for a pocket computer according to claim 33, wherein said swivel section is pivotally mounted between a function exhibiting section and the pivotal portions.

42. A body structure for a pocket computer according to claim 28, wherein said swivel section is pivotally mounted between a function exhibiting section and the pivotal portions.

43. A body structure for a pocket computer according to claim 11, wherein a keyboard is made up of a housing plate and a plurality of entry keys, said housing plate being provided with a plurality of key tubular holes arranged thereon in sequence, with each of said key tubular holes including a tubular flange, said tubular flange having slide keys disposed oppositely at the positions located on an opposite angular line thereof and hook retaining ears disposed on another opposite angular line thereof; said entry key being composed of a suppressing column located at a center of a bottom surface thereof and an enclosing flange of circular construction located at the bottom surface thereof and dimensioned to accommodate therein said tubular flange of said housing plate, said entry key further comprising slide key mounts and hooks, said slide key mounts are disposed at the opposite angular positions on said enclosing flange and are positioned correspondingly to said slide keys of said tubular flange so that said slide key mounts engage with said slide keys, and hooks are disposed at positions located on another opposite angular line thereof to correspond position-wise to said hook retaining ears of said housing plate.

44. A body structure for a pocket computer according to claim 1, wherein a keyboard is made up of a housing plate and a plurality of entry keys, said housing plate being provided with a plurality of key tubular holes arranged thereon in sequence, with each of said key tubular holes including a tubular flange, said tubular flange having slide keys disposed oppositely at the positions located on an opposite angular line thereof and hook retaining ears disposed on another opposite angular line thereof; said entry key being composed of a suppressing column located at a center of a bottom surface thereof and an enclosing flange of circular construction located at the bottom surface thereof and dimensioned to accommodate therein said tubular flange of said housing plate, said entry key further comprising slide key mounts and hooks, said slide key mounts are disposed at the opposite angular positions on said enclosing flange and are positioned correspondingly to said slide keys of said tubular flange so that said slide key mounts engage with said slide keys, and hooks are disposed at positions located on another opposite angular line thereof to correspond position-wise to said hook retaining ears of said housing plate.

45. A body structure for a pocket computer according to claim 44, wherein said slide keys and said slide key mounts are disposed respectively at central positions of opposite sides of said housing plate and of a sole plate of said entry key; and wherein said hooks and said hook retaining ears are disposed respectively at central positions of other opposite sides of said entry key and said housing plate.

46. A body structure for a pocket computer according to claim 45, wherein said housing plate is provided with a regulation slot of a shape positioned correspondingly with said slide key; and wherein said enclosing flange of said entry key comprises thereon slide key mounts positioned correspondingly to said slide keys.

47. A body structure for a pocket computer according to claim 45, wherein said enclosing flange comprises two slide key mounts positioned oppositely; and wherein said housing plate comprises slide keys positioned correspondingly to said slide key mounts.

48. A body structure for a pocket computer according to claim 45, wherein said housing plate is provided with a retreat hole, which is located under said hook retaining ear; and wherein said entry key is provided with hooks disposed at a bottom surface thereof and positioned correspondingly with said hook retaining ears.

49. A body structure for a pocket computer according to claim 45, wherein said entry key includes a face plate and a sole plate, which are of different colors and are made integrally into a unitary body, said face plate comprising thereon a figured hole coinciding with a given alphanumerical symbol.

50. A body structure for a pocket computer according to claim 45, wherein said entry key is provided with hooks disposed at a distance from said enclosing flange thereof; and wherein said housing plate is provided hook retaining ears positioned correspondingly with said hooks.

51. A body structure for a pocket computer according to claim 44, wherein said housing plate is provided with a regulation slot of a shape positioned correspondingly with said slide key; and wherein said enclosing flange of said entry key comprises thereon slide key mounts positioned correspondingly to said slide keys.

52. A body structure for a pocket computer according to claim 44, wherein said enclosing flange comprises two slide key mounts positioned oppositely; and wherein said housing plate comprises slide keys positioned correspondingly to said slide key mounts.

53. A body structure for a pocket computer according to claim 44, wherein said housing plate is provided with a retreat hole, which is located under said hook retaining ear; and wherein said entry key is provided with hooks disposed at a bottom surface thereof and positioned correspondingly with said hook retaining ears.

54. A body structure for a pocket computer according to claim 44, wherein said entry key is provided with hooks disposed at a distance from said enclosing flange thereof; and wherein said housing plate is provided with hook retaining ears positioned correspondingly with said hooks.

55. A body structure for a pocket computer according to claim 44, wherein said entry key includes a face plate and a sole plate, which are of different colors and are made integrally into a unitary body, said face plate comprising thereon a figured hole coinciding with a given alphanumerical symbol.

* * * * *